United States Patent [19]

Akatsu et al.

[11] 3,906,003
[45] Sept. 16, 1975

[54] BENZODIAZEPINE DERIVATIVES AND PREPARATION THEREOF

[75] Inventors: Mitsuhiro Akatsu, Toyonaka; Yoshiharu Kume, Takarazuka; Toshiyuki Hirohashi, Ashiya; Shigeho Inaba, Takarazuka; Hisao Yamamoto, Nishinomiya; Hiromi Sato, Takarazuka, all of Japan

[73] Assignee: Sumitomo Chemical Company Limited, Osaka, Japan

[22] Filed: Nov. 1, 1971

[21] Appl. No.: 194,690

[30] Foreign Application Priority Data

Nov. 16, 1970 Japan............... 45-101332
Nov. 21, 1970 Japan............... 45-102951
Nov. 28, 1970 Japan............... 45-105103
Nov. 28, 1970 Japan............... 45-105105
Nov. 28, 1970 Japan............... 45-105106
Dec. 8, 1970 Japan............... 45-109966
Dec. 9, 1970 Japan............... 45-109770
Dec. 11, 1970 Japan............... 45-114462

[52] U.S. Cl...... 260/239.3 D; 260/340.5; 260/340.6; 260/340.9; 260/561 A; 424/244; 424/278; 424/282; 260/306.7; 260/307 B; 260/326.15; 260/570 AB; 260/349
[51] Int. Cl............................................. C07d 53/06
[58] Field of Search............................ 260/239.3 D

[56] References Cited

UNITED STATES PATENTS

| | | | |
|---|---|---|---|
| 3,236,838 | 2/1966 | Archer et al............... | 260/239.3 D |
| 3,299,053 | 1/1967 | Archer et al............... | 260/239.3 D |
| 3,371,085 | 2/1968 | Reeder et al. ............. | 260/239.3 D |
| 3,391,138 | 7/1968 | Archer et al............... | 260/239.3 D |
| 3,703,510 | 11/1972 | Earley et al................ | 260/239.3 D |
| 3,732,211 | 5/1973 | Hellerbach et al. ........ | 260/239.3 D |
| 3,757,008 | 9/1973 | Hellerbach et al. ........ | 260/239.3 D |

FOREIGN PATENTS OR APPLICATIONS

2,005,508 8/1970 Germany

*Primary Examiner*—Henry R. Jiles
*Assistant Examiner*—Robert T. Bond
*Attorney, Agent, or Firm*—Stevens, Davis, Miller & Mosher

[57] ABSTRACT

Novel benzodiazepines having valuable pharmaceutical properties, which are represented by the formula

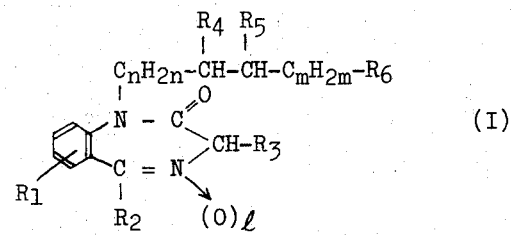

(I)

wherein $R_1$ represents hydrogen, halogen, nitro or trifluoromethyl; $R_2$ represents pyridyl, cyclohexenyl or a group of the formula

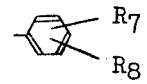

[in which $R_7$ and $R_8$ each represent hydrogen, halogen, lower alkyl or trifluoromethyl]; $R_3$ represents hydrogen, lower alkyl, aryl or aralkyl; $R_4$ represents hydroxy, lower alkoxy or acyloxy; $R_5$ represents hydrogen, hydroxy or acyloxy, provided that $R_4$ and $R_5$ are not hydroxy group simultaneously; or $R_4$ and $R_5$ together may be joined to form a group of the formula,

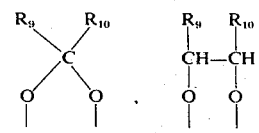

or

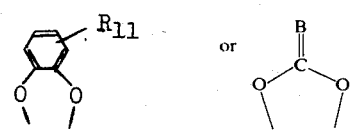

[in which $R_9$ and $R_{10}$ each represents hydrogen, lower alkyl, lower alkenyl, aryl, aralkyl, cycloalkyl or cycloalkylalkyl; $R_{11}$ represents hydrogen, lower alkyl or halogen; and B represents oxygen or sulfur]; $R_6$ represents hydrogen, cyano, acyloxy, alkoxycarbonyl or a group of the formula,

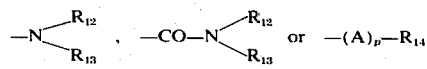

[in which $R_{12}$ and $R_{13}$ each represent hydrogen or lower alkyl, or $R_{12}$ and $R_{13}$ may form an optionally substituted 5- or 6-membered heterocyclic ring together with the adjacent nitrogen atom, and said heterocyclic ring may further contain one or more hetero atom; $R_{14}$ represents hydrogen, acyl, lower alkyl, lower alkenyl, cycloalkyl, cycloalkylalkyl, aryl, aralkyl, polyhaloalkyl or cyanoalkyl; A represents oxygen, sulfur, sulfinyl or sulfonyl; and $p$ represents 0 or 1]; $l$ represents 0 or 1; $m$ represents 0, 1, 2 or 3; and $n$ represents 1, 2, 3 or 4.

6 Claims, No Drawings

BENZODIAZEPINE DERIVATIVES AND PREPARATION THEREOF

This invention relates to novel benzodiazepines and salts thereof. More particularly, this invention pertains to novel benzodiazepines represented by the formula,

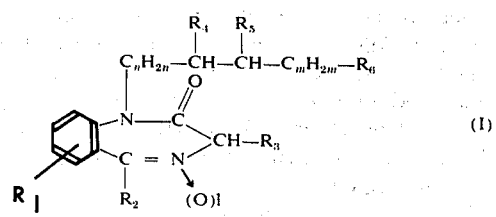

wherein $R_1$ represents hydrogen, halogen, nitro or trifluoromethyl; $R_2$ represents pyridyl, cyclohexenyl or a group of the formula

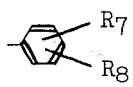

[in which $R_7$ and $R_8$ each represent hydrogen, halogen, lower alkyl or trifluoromethyl]; $R_3$ represents hydrogen, lower alkyl, aryl or aralkyl; $R_4$ represents hydroxy, lower alkoxy or acyloxy; $R_5$ represents hydrogen, hydroxy or acyloxy, provided that $R_4$ and $R_5$ are not hydroxy groups simultaneously; or $R_4$ and $R_5$ together may be joined to form a group of the formula,

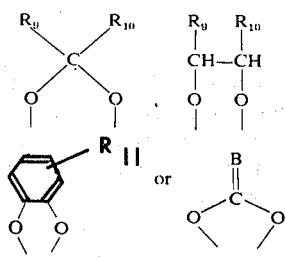

[in which $R_9$ and $R_{10}$ each represents hydrogen, lower alkyl, lower alkenyl, aryl, aralkyl, cycloalkyl or cycloalkylalkyl; $R_{11}$ represents hydrogen, lower alkyl or halogen; and B represents oxygen or sulfur]; $R_6$ represents hydrogen, cyano, acyloxy, alkoxycarbonyl or a group of the formula,

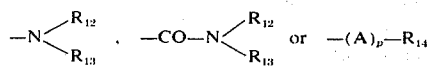

[in which $R_{12}$ and $R_{13}$ each represent hydrogen or lower alkyl, or $R_{12}$ and $R_{13}$ may form an optionally substituted 5- or 6-membered heterocyclic ring together with the adjacent nitrogen atom, and said heterocyclic ring may further contain one or more hetero atom; $R_{14}$ represents hydrogen, acyl, lower alkyl, lower alkenyl, cycloalkyl, cycloalkylalkyl, aryl, aralkyl, polyhaloalkyl or cyanoalkyl; A represents oxygen, sulfur, sulfinyl or sulfonyl; and $p$ represents 0 or 1]; $l$ represents 0 or 1; $m$ represents 0, 1, 2 or 3; and $n$ represents 1, 2, 3 or 4; and process for the production thereof and pharmaceutical use of the same.

In the compounds represented by the aforesaid formula (I), the term "halogen" includes chlorine, bromine, iodine and fluorine. The term "alkyl" includes both straight and branched hydrocarbon chains; the "lower alkyl" includes, for example, methyl, ethyl, n-propyl, iso-propyl, n-butyl and t-butyl; the "lower alkoxy" includes, for example, methoxy, ethoxy, n-propoxy, isopropoxy, n-butoxy and t-butoxy; the "cycloalkyl" includes, for example, cyclopropyl, cyclobutyl, cyclohexyl and cyclopentyl; the "cycloalkylalkyl" includes, for example, cyclopropylmethyl, cyclobutylmethyl, cyclobutylethyl, cyclopentylmethyl, cyclohexylmethyl and cyclohexylethyl; and "lower alkenyl" includes, for example, allyl, vinyl, butenyl and the like. The "aryl" includes, for example, phenyl, naphthyl and mono- or disubstituted phenyl wherein the substituents on the phenyl ring can be halogen such as chlorine, fluorine, bromine or iodine, lower alkyl such as methyl or ethyl, lower alkoxy such as methoxy or ethoxy; nitro and trifluoromethyl; and the "aralkyl" includes, for example, benzyl, phenethyl, β-phenylpropyl and naphtethyl. The term "polyhaloalkyl" refers to lower alkyl radicals substituted with more than one halogen atoms and preferably includes such moieties as trifluoromethyl, 2,2,2-trifluoroethyl, 2,2,3,3,3-pentafluoropropyl and the like. The term "acyl" and "acyloxy" referred to herein is preferably derived from hydrocarbon carboxylic acids containing less than 12 carbon atoms which may be saturated or unsaturated, of straight, branched, cyclic, heterocyclic or cyclic-aliphatic chain or aromatic, and may be substituted by functional group such as hydroxy, alkoxy containing up to 5 carbon atoms, nitro, amino or halogen. The alkylene group of the formulas $-C_nH_{2n}-$ and $-C_mH_{2m}-$ independently represent a straight-chain or branched-chain alkylene group having 1 to 4 carbon atoms and includes, for example, methylene, ethylene, 1-methylethylene, 2-methylethylene, trimethylene, 1-methyltrimethylene and 2-methyltrimethylene groups.

The benzodiazepines represented by the aforesaid formula (I) and salts thereof are novel compounds. It has surprisingly been found by the present inventors that the compounds represented by the formula (I), and their pharmaceutically acceptable salts with inorganic and organic acids, have valuable pharmacological properties, in particular excellent tranquillizing, sedative, muscle relaxant, spasmolytic and hypnotic activities.

Accordingly, an object of the present invention is to provide novel and useful benzodiazepines and salts thereof which have excellent pharmacological properties. Another object is to provide a process for producing such novel and useful benzodiazepines and salts thereof. A further object is to provide pharmaceutical composition containing such novel and useful benzodiazepines or salts thereof. Other objects and merits of the present invention will be apparent from the following descriptions.

In order to accomplish these objects the present invention provides novel benzodiazepines represented by the formula (I) and acid addition salts thereof.

According to the present invention, the novel benzodiazepines represented by the formula (I) may be prepared by a variety of methods.

One method for producing the benzodiazepines of the formula (I) comprises reacting a 1-unsubstituted benzodiazepine represented by the formula,

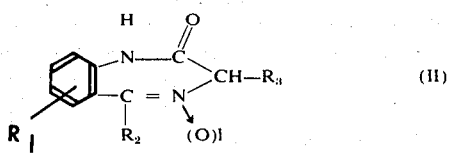

wherein $R_1$, $R_2$, $R_3$ and $l$ are as defined in the formula (I) above, with a reactive ester of a compound represented by the formula,

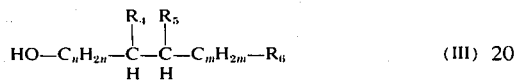

wherein $R_4$, $R_5$, $R_6$, $m$ and $n$ are as defined above. Examples of reactive esters include hydrohalic acid esters such as the chlorides, bromides and iodides and sulfonic acid esters such as methanesulfonate, p-toluenesulfonate, β-naphthalenesulfonate and trichloromethanesulfonate.

The preferred compounds of the formula (III) include compounds of the formulas,

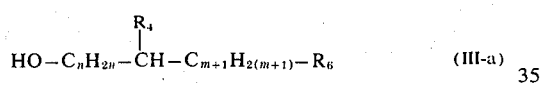

and

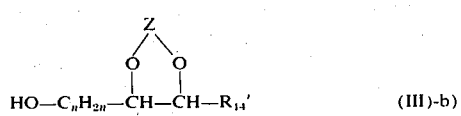

wherein $R_4$, $R_6$, $n$ and $m$ are as defined above, and Z represents a group of the formula,

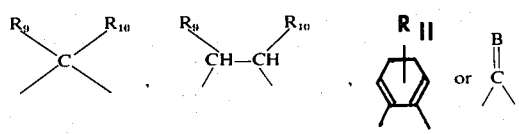

[in which $R_9$, $R_{10}$, $R_{11}$ and B are as defined above], and $R_{14}'$ represents hydrogen, lower alkyl, lower alkenyl, cycloalkyl, cycloalkylalkyl, aryl or aralkyl.

The reaction may be carried out by reacting a compound of the formula (II) with a reactive ester of the compound of the formula (III) which is inclusive of a compounds of the formula (III-a) and (III-b) in the presence of an alkaline agent or by contacting the compound of the formula (II) with an alkaline agent to form the metal salt and then contacting the resulting metal salt with a reactive ester of the compound of the formula (III). Examples of the alkaline agents include alkali metal hydride such as sodium hydride or lithium hydride, alkali metal hydroxide such as potassium hydroxide, alkali metal amide such as sodium amide, potassium amide or lithium amide, alkylalkali such as butyl lithium, phenylalkali such as phenyl lithium, alkali metal alcoholate such as sodium methylate, sodium ethylate, potassium tertiary-butoxide or the like. The reaction may generally be effected in an organic solvent or solvent mixture. Suitable solvents include benzene, toluene, xylene, dimethylformamide, dimethylacetamide, diphenyl ether, diglyme, dimethyl sulfoxide, methyl ethyl ketone, N-methyl pyrrolidone and the like, and a mixture thereof. The reaction may be carried out at a temperature within the range between about room temperature and the boiling point of the solvent employed.

The compounds represented by the formula,

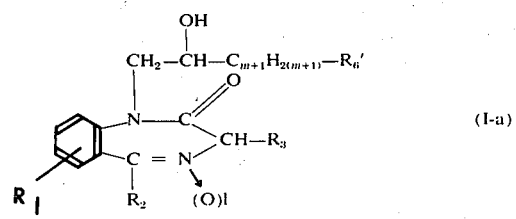

wherein $R_1$, $R_2$, $R_3$, $l$ and $m$ are as defined above, and $R_6'$ represents hydrogen, cyano, or a group of the formula,

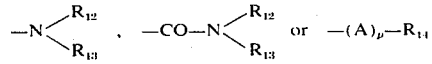

[in which $R_{12}$, $R_{13}$, $R_{14}$, A and $p$ are as defined above]; which are falling under the scope of the formula (II), may also be obtained by treating a 1-unsubstituted benzodiazepine of the formula (II) with a compound represented by the formula,

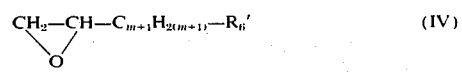

wherein $R_6'$ and $m$ are as defined above. The reaction may be carried out by reacting a compound of the formula (II) with a compound of the formula (IV) in the presence of an alkaline agent or by contacting a compound of the formula (II) with an alkaline agent to form the metal salt and then contacting the resulting metal salt with a compound of the formula (IV). Examples of the alkaline agents include sodium hydroxide, potassium hydroxide, sodium amide, potassium amide, lithium amide, lithium hydride, butyl lithium, phenyl lithium, sodium hydride, sodium methylate, sodium ethylate, potassium teriarybutoxide and the like.

The reaction may generally be effected in an organic solvent or solvent mixture. Suitable solvents include methanol, ethanol, isopropanol, benzene, toluene, xylene, dimethylformamide, dimethylacetamide, diphenyl ether, diglyme, dimethyl sulfoxide, methyl ethyl ketone, and the like, and a solvent mixture thereof. The reaction may be carried out at room temperature or at elevated temperatures. The reaction may be conducted at atmospheric or superatmospheric pressure.

The compounds represented by the formula,

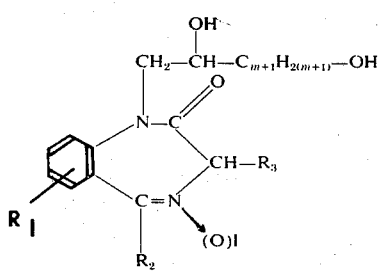

(I-b)

wherein $R_1$, $R_2$, $R_3$, $l$ and $m$ are as defined above, which are falling under the scope of the formula (I), may also be obtained by treating a 1-unsubstituted benzodiazepine of the formula (II) with a compound represented by the formula,

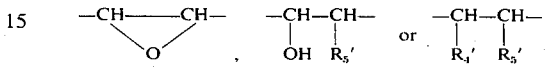

(V)

wherein $m$ is as defined above and $R_6'''$ represents acyloxy. The reaction may be carried out by reacting a compound of the formula (II) with a compound of the formula (V) in the presence of an alkaline agent or by contacting the compound of the formula (II) with an alkaline agent to form the metal salt and then contacting the resulting metal salt with a compound of the formula (V). Examples of the alkaline agents include sodium hydroxide, potassium hydroxide, sodium amide, potassium amide, lithium amide, lithium hydride, sodium hydride, butyl lithium, phenyl lithium, sodium methoxide, sodium ethoxide, potassium tertiary-butoxide and the like. The reaction is generally carried out in a solvent or solvent mixture. Examples of the solvents include toluene, xylene, benzene, dimethylformamide, dimethyl sulfoxide, methanol, ethanol, isopropanol, tertiary-butanol and the like, and a mixture thereof.

The compounds represented by the formula,

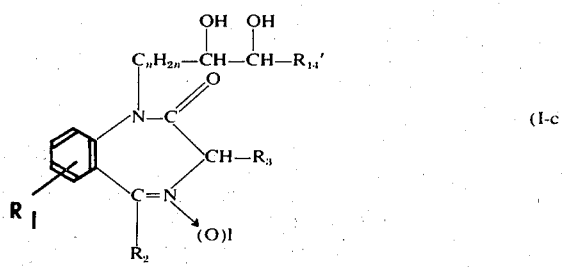

(I-c)

wherein $R_1$, $R_2$, $R_3$, $l$ and $n$ are as defined above, and $R_{14}'$ represents hydrogen, lower alkyl, lower alkenyl, cycloalkyl, cycloalkylalkyl, aryl or aralkyl, which are falling under the scope of the formula (I), may also be prepared by hydrolyzing a compound represented by the formula,

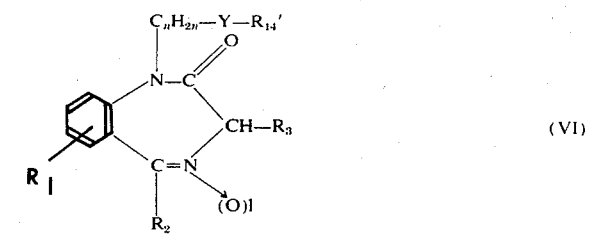

(VI)

wherein $R_1$, $R_2$, $R_3$, $R_{14}'$, $l$ and $n$ are as defined above, Y represents a group of the formula,

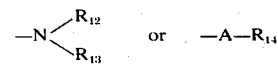

[in which $R_4'$ and $R_5'$ each represent acyloxy], or salts thereof.

The hydrolysis is carried out in a solvent or solvent mixture, preferably in the presence of a hydrolyzing agent. Suitable solvents include water or lower alkanol such as methanol, ethanol, isopropanol, or mixtures of water and organic solvent such as lower alkanol (e.g. methanol, ethanol, propanol and isopropanol), dioxane, acetone, ethylene glycol, propylene glycol, ethylene glycol monomethyl ether, ethylene glycol monoethyl ether, ethylene glycol monobutyl ether, ethylene glycol dimethyl ether, ethylene glycol diethylether, diethylene glycol lower alkyl ether, dimethyl sulfoxide and the like. Examples of the hydrolyzing agents include alkali metal hydroxide such as sodium hydroxide and potassium hydroxide, alkaline earth metal hydroxide such as barium hydroxide and calcium hydroxide, alkali metal carbonate such as sodium carbonate and potassium carbonate, alkali metal alkoxide such as sodium methoxide and sodium ethoxide, and mineral acid such as hydrochloric acid, hydrobromic acid, hydoiodic acid and sulfuric acid. The reaction may generally be carried out at room temperature, but the temperature may be higher or lower as necessary to effect the desired control of the reaction.

The compounds represented by the formula,

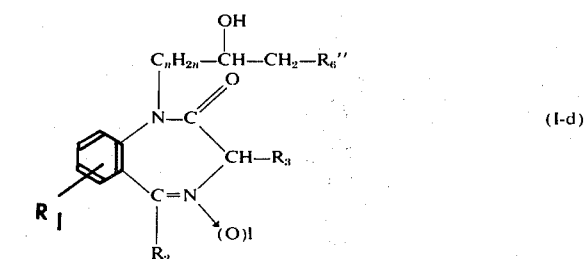

(I-d)

wherein $R_1$, $R_2$, $R_3$, $l$ and $n$ are as defined above, and $R_6''$ represents a group of the formula, $$-N\begin{matrix}R_{12}\\R_{13}\end{matrix} \quad \text{or} \quad -A-R_{14}$$

[in which $R_{12}$, $R_{13}$, $R_{14}$ and A are as defined above], which are falling under the scope of the formula (I), may also be prepared by reacting a compound of the formula (VII), wherein $R_{14}'$ is hydrogen, i.e. compound represented by the formula,

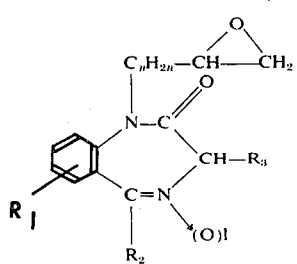

(VII-a)

wherein $R_1$, $R_2$, $R_3$, $l$ and $n$ are as defined above, with a compound represented by the formula, $$R_6''H \quad \text{(VIII)}$$

wherein $R_6''$ is as defined above, or metal salt thereof. The reaction may be carried out by reacting a compound of the formula (VII-a) with a compound of the formula (VIII) in the presence of an alkaline agent or by contacting the compound of the formula (VIII) with an alkaline agent to form the metal salt and then contacting the resulting metal salt with the compound of the formula (VII-a). Examples of the alkaline agents include alkali metals, alkaline earth metals, alkali metal hydrides, alkaline earth metal hydrides, alkali metal hydroxides, alkaline earth metal hydroxides, alkali metal amides, alkaline earth metal amides, alkali metal alkoxides, alkaline earth metal alkoxides, alkylalkali metals and arylalkali metals. Preferred agents are sodium, potassium, lithium, sodium hydride, lithium hydride, sodium amide, potassium amide, lithium amide, sodium methylate, sodium ethylate, butyllithium, phenylsodium and phenyllithium. The reaction may preferably be carried out in an organic solvent or solvent mixture. Suitable solvents include methanol, ethanol, isopropanal, dioxane, tetrahydrofuran, benzene, toluene, xylene, dimethylformamide, diglyme, dimethyl sulfoxide, and the like, and a solvent mixture thereof. The reaction may be carried out at room temperature or at elevated temperatures, under atmospheric or superatmospheric pressure.

The compounds represented by the formula,

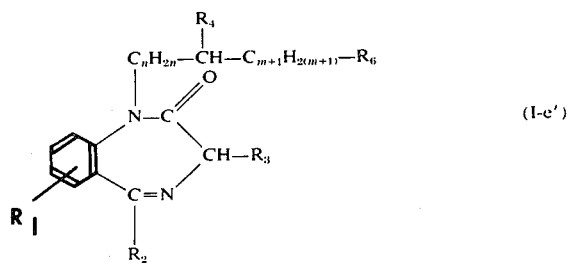

(I-e′)

wherein $R_1$, $R_2$, $R_3$, $R_4$, 6, $m$ and $n$ are as defined above, which are falling under the scope of the compound of the formula (I), may also be prepared by reacting an aminoketone derivative represented by the formula,

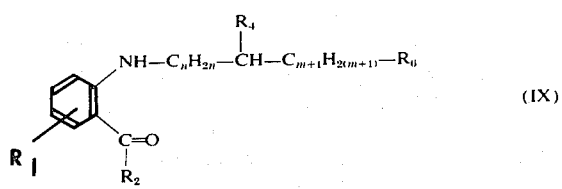

(IX)

wherein $R_1$, $R_2$, $R_4$, $R_6$, $m$ and $n$ are as defined above, with a compound represented by the formula,

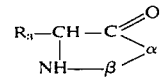

(X)

wherein $R_3$ is as defined above, $\alpha$ represents oxygen or sulfur and $\beta$ represents carbonyl or a group of the formula > P-hal in which the term "hal" represents halogen, for example, chlorine, bromine or iodine. The reaction is carried out in the presence of a solvent or solvent mixture. Suitable solvents include, for example, chloroform, carbon tetrachloride, methylene chloride, ethylene chloride, ether, diisopropyl ether, tetrahydrofuran, dioxane, water, methanol, ethanol, dimethylformamide, dimethyl sulfoxide or a mixture thereof. The reaction is, generally, carried out in the presence of an acid. The acid used in this process includes hydrogen chloride, hydrogen bromide, sulfuric acid, phosphoric acid, polyphosphoric acids, borontrifluoride and paratoluenesulfonic acid. The reaction is effected at a temperature ranging from −25°C to about 120°C, and more preferably from about 0°C to about 30°C. Temperatures above and below the aforesaid ranges can also be employed but are less preferred. In most instances, the reaction can be conducted at room temperature or below. Pressure is not critical and the process can be conducted at atmospheric, subatmospheric or superatomospheric pressure. The process, if desired, can be conducted in an inert atmosphere, such as nitrogen, argon and the like.

Further, the compounds of the formula (I-e′) may also be prepared by contacting a compound represented by the formula,

(XI)

wherein $R_1$, $R_2$, $R_3$, $R_4$, $R_6$, $m$ and $n$ are as defined above, or acid addition salts thereof, with an oxidizing agent. Examples of the acid addition salt include hydrochloride, hydrobromide, sulfate or phosphate. The oxidizing agent for this process includes, for example, ozone, hydrogen peroxide, peracid (e.g. performic, peracetic and perbenzoic acid), chromic acid and potassium permanganate, but is not limited to the named compounds. Generally, the reaction progresses readily at room temperature, but the temperature may be higher or lower, for example, 0° − about 100°C or a boiling point of the solvents, preferably 10°–60°C, as necessary to effect the desired control of the reaction, and the reaction temperature varies depending on the oxidizing agent employed. The preferable oxidizing agent is chromic acid or ozone. The reaction is preferably effected in the presence of a solvent. The choice of solvent depends on the oxidizing agent employed, and is selected from the group consisting of water, acetone, carbon tetrachloride, formic acid, acetic acid, sulfuric acid and the like. The oxidizing agent is used in the stoichiometric amount or more.

Where the oxidation is carried out by use of chromic acid in the presence of acetic acid, it is preferable that the chromic acid may be used in 2–3 times the equimolar amount. A 2-aminomethylindole derivative is dissolved or suspended in the solvent and the oxidizing agent is added to the solution or suspension with stirring.

Where the oxidation is carried out by use of ozone, 2-aminomethylindole derivative is dissolved or suspended in the solvent such as formic acid, acetic acid, carbon tetrachloride or the like and ozonized oxygen is bubbled into the solution or suspension with stirring.

The desired benzodiazepine derivative can be separated from the reaction mixture in a crude form by extraction, with or without prior neutralization, and by evaporation to dryness.

Still further, the compounds of the formula (I-e') may also be prepared by treating a compound represented by the formula,

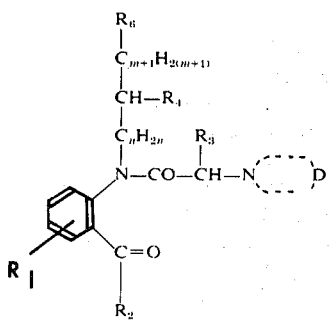

(XIII)

wherein $R_1$, $R_2$, $R_3$, $R_4$, $R_6$, $m$ and $n$ are as defined above, and D is a nitrogen protecting system comprising at least one readily removable group, whereby to remove the system D. Said protecting system D is comprised of a group or groups which can be readily removed by conventional procedures well disclosed in the literature. Examples of the protecting system D are a phthaloyl group, a lower alkylidene group such as isopropylidene, a benzal group, one carbobenzoxy group and one hydrogen that is,

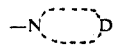

is a group of the formula

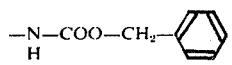

and the like. The removal of the protecting system is effected by utilizing conventional procedures well established in the art. For example, if D in the formula (XII) represents a phthaloyl group as the protective group, the system is removed by reacting such compounds with hydrazine derivatives such as hydrazine hydrate or phenylhydrazine, whereby to prepare the objective compound of the formula (I-e'). The reaction is preferably effected in the presence of a solvent or solvent mixture. Suitable solvents are, for example, methanol, ethanol, isopropanol, water and the mixture thereof. The reaction is carried out at a temperature within the range between about room temperature and the boiling point of the solvent employed.

If the system D in the formula (XII) consists of a carbobenzoxy group as the removable group and hydrogen, the removal of the system is effected by using hydrogen halide. Suitable hydrogen halides include hydrogen bromide and hydrogen chloride. The preferred hydrogen halide is hydrogen bromide. The hydrogen halide may be used as hydrohalic acid such as hydrobromic acid or hydrochloric acid. The reaction is carried out in a solvent or solvent mixture. Suitable solvents are methanol, ethanol, acetic acid, water or the like, or a mixture thereof.

The reaction is carried out at a temperature within the range between about room temperature and the boiling point of the solvent used. The process may either proceed directly to the desired compounds of the formula (I-e') or through intermediates of the formula,

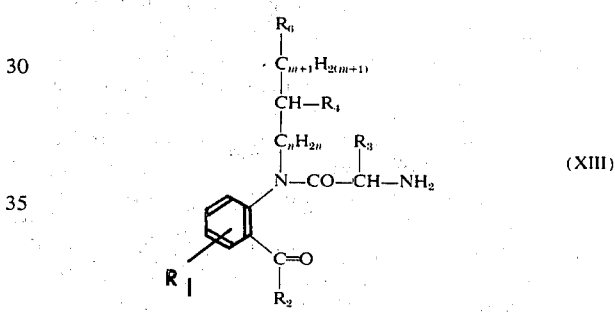

wherein $R_1$, $R_2$, $R_3$, $R_4$, $R_6$, $m$ and $n$ are as defined above, which may then be cyclized to the desired compound of the formula (I-e'). The intermediate of the formula (XIII), if desired, may be isolated as the hydrohalides by the selection of mild reaction conditions, such as appropriate reaction temperature and reaction time. The compound of the formula (XIII) may be ring-closed to the desired compound of the formula (I-e') by being allowed to stand at room temperature or at an elevated temperature in a suitable solvent such as acetic acid, methanol, ethanol, pyridine, dimethyl sulfoxide or the like with or without treatment with a base.

The compounds of the formula (XII) may be obtained, for example, by treating a compound represented by the formula,

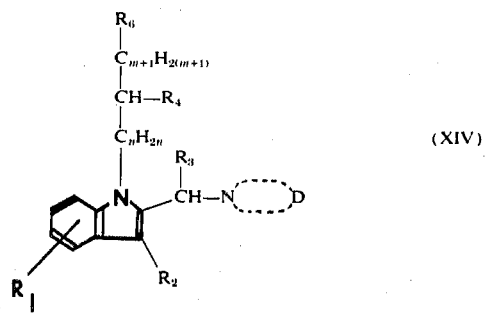

wherein $R_1$, $R_2$, $R_3$, $R_4$, $R_6$, $m$, $n$ and D are as above, with an oxidizing agent.

Still further, the compounds of the formula (I-e') may also be prepared by treating a compound represented by the formula,

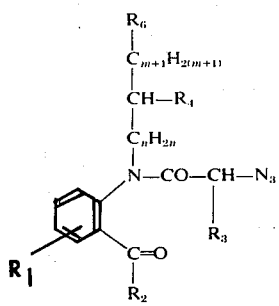
(XV)

wherein $R_1$, $R_2$, $R_3$, $R_4$, $R_6$, $m$ and $n$ are as defined above, with a suitable reducing agent. Examples of the reducing agents include stannous chloride, zinc-hydrochloric acid, aluminium amalgam, hydrogen in the presence of a catalyst (e.g. platinium, palladium and Raney nickel), hydrazine in the presence of palladized charcoal, hydrogen sulfide, hydrohalic acid, dithionite (e.g. sodium dithionite, potassium dithionite or the like), metal hydride such as lithium aluminium hydride and the like. The reaction is effected in the presence of a solvent or solvent mixture. The choice of the solvent depends upon the reducing agent employed, and is selected from the group consisting of water, methanol, ethanol, acetic acid, ether, dioxane, tetrahydrofuran, ethyl acetate and the like. The reaction may be carried out at room temperature or at elevated temperature.

The starting compounds of the formula (XIV) may be obtained, for example, by reacting aminoketone derivative of the formula (IX) with a compound of the formula, $$N_3—CH—CO—hal$$
$$\ \ \ \ \ \ \ \ |$$
$$\ \ \ \ \ \ \ \ R_3$$
(XVI)

wherein $R_3$ and "hal" are as defined above.

Compounds corresponding to the formula (I), which are obtained by the process of this invention, can be converted to other compounds corresponding to the formula (I).

For example, the compounds of the formula (I-e') wherein $R_4$ is hydroxy, i.e. compounds represented by the formula,

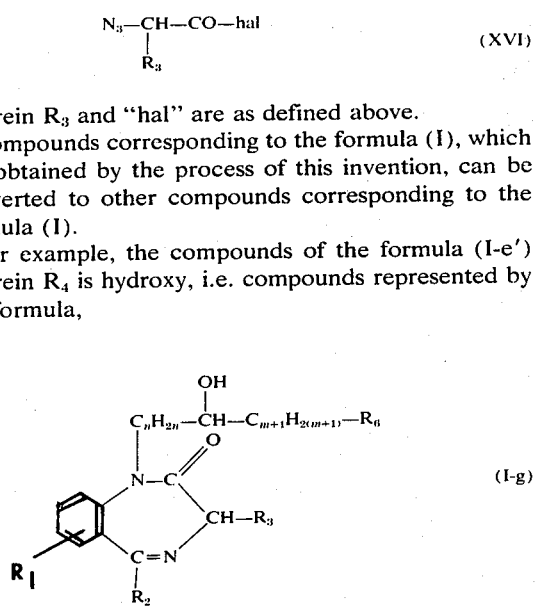
(I-g)

wherein $R_1$, $R_2$, $R_3$, $R_6$, $m$ and $n$ are as defined above, may be converted to the corresponding compounds represented by the formula,

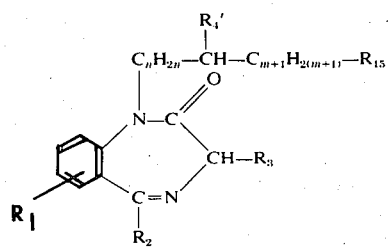
(I-h)

wherein $R_1$, $R_2$, $R_3$, $m$ and $n$ are as defined above, $R_4'$ is acyloxy, and $R_{15}$ represents hydrogen, cyano, acyloxy or the group of the formula,

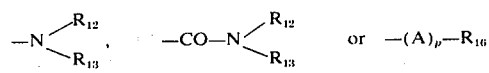

[wherein $R_{12}$, $R_{13}$, A and $p$ are as defined above, and $R_{16}$ represents lower alkyl, lower alkenyl, cycloalkyl, cycloalkylalkyl, acyl, aryl, aralkyl trihaloalkyl or cyanoalkyl]. This conversion is effected by reacting a compound of the formula (I-g) with a carboxylic acid of the formula, $$R_4' — H$$
(XVII)

wherein $R_4'$ is as defined above, or its reactive derivative. Examples of reactive derivative include acid halide such as acid chloride, acid bromide or acid iodide, anhydride and mixed anhydride and the like. Examples of the carboxylic acid of the formula (XVII) include lower alkanoic acid (e.g. formic, acetic, propionic, hexanoic and enanthoic acid), lower alkenoic acid, cycloalkane carboxylic acid, cycloalkylalkanoic acid, aromatic carboxylic acid (e.g. benzoic acid) aryl-lower alkanoic acid (e.g. phenylacetic acid and β-phenylpropionic acid), aryl-lower alkenoic acid, aryloxyalkanoic acid, alkoxyalkanoic acid, pyridine carboxylic acid, pyridylalkanoic acid, haloalkanoic acid and trihaloalkanoic acid, and the like. The reaction is generally carried out in the presence of a solvent such as benzene, toluene, xylene, tetrahydrofuran, dimethylformamide or the like. The reaction is generally carried out at room temperature or at elevated temperatures. Where the reaction is carried out by use of acid halide, the reaction may be carried out in the presence of an acid-binding agent. Examples of the acid-binding agents include organic tertiary base such as triethylamine, pyridine or dimethylaniline, and alkali metal salt of carboxylic acid.

The compounds represented by the formula,

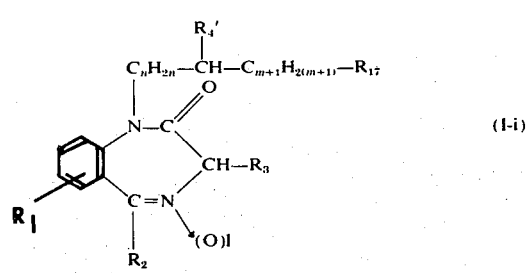
(I-i)

wherein $R_1$, $R_2$, $R_3$, $R_4$, $l$, $m$ and $n$ are as defined above, and $R_{17}$ represents a group of the formula,

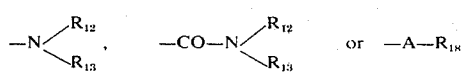

[in which $R_{12}$, $R_{13}$ and A are as defined above, and $R_{18}$ represents lower alkyl, lower alkenyl, cycloalkyl, cycloalkylalkyl, aryl, aralkyl, trihaloalkyl or cyanoalkyl], or acid addition salts thereof, may be hydrolyzed to the corresponding compounds represented by the formula,

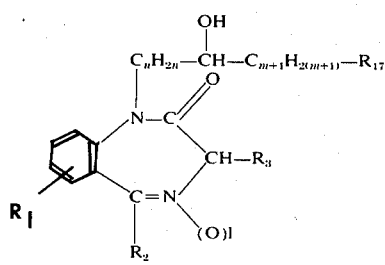

(I-j)

wherein $R_1$, $R_2$, $R_3$, $R_{17}$, $l$, $m$ and $n$ are as defined above. The hydrolysis is carried out in a solvent or solvent mixture, preferably in the presence of a hydrolyzing agent. Suitable solvents include water or lower alkanol such as methanol, ethanol, isopropanol, or mixtures of water and organic solvent such as lower alkanol (e.g. methanol, ethanol, propanol and isopropanol), dioxane, acetone, ethylene glycol, propylene glycol, ethylene glycol monomethyl ether, ethylene glycol monoethyl ether, ethylene glycol diethylether, dimethyl sulfoxide and the like. Examples of the hydrolyzing agents include alkali metal hydroxide such as sodium hydroxide and potassium hydroxide, alkaline earth metal hydroxide such as barium hydroxide and calcium hydroxide, alkali metal carbonate such as sodium carbonate and potassium carbonate, alkali metal alkoxide such as sodium methoxide and sodium ethoxide, mineral acid such as hydrochloric acid, hydrobromic acid, and hydroiodic acid. The reaction is carried out at room temperature or at elevated temperature.

Further, the compounds of the formula (I-c) may be converted to the corresponding compounds of the formula,

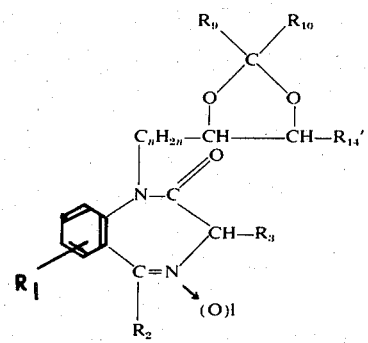

(I-k)

wherein $R_1$, $R_2$, $R_3$, $R_9$, $R_{10}$, $R_{14}'$, $l$ and $n$ are as defined above. This conversion is effected by reacting a compound of the formula (I-c) with a carbonyl compound of the formula,

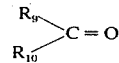

(XVIII)

wherein $R_9$ and $R_{10}$ are as defined above, or dialkoxy derivative thereof. Examples of the dialkoxy derivatives include dimethoxy compounds such as 2,2-dimethoxypropane, diethoxy compounds such as 2,2-diethoxypropane and methoxyethoxy compounds such as 2-methoxy-2-ethoxypropane. The reaction is preferably carried out in an inert solvent in the presence of dehydrating agent. Examples of the dehydrating agents include sulfuric acid, hydrochloric acid, p-toluenesulphonic acid, methanesulphonic acid, anhydrous copper sulfate or the like. Examples of the inert solvents include toluene, benzene, xylene, dioxane, tetrahydrofuran, dimethylformamide, methylene chloride, chloroform, carbon tetrachloride and the like. An excess of the carbonyl compound of the formula (XVIII) or dialkoxy derivative thereof may be used as a solvent. The reaction may be effected at room temperature, but the temperature may be higher or lower as necessary to effect the desired control of the reaction.

The compounds of the formula,

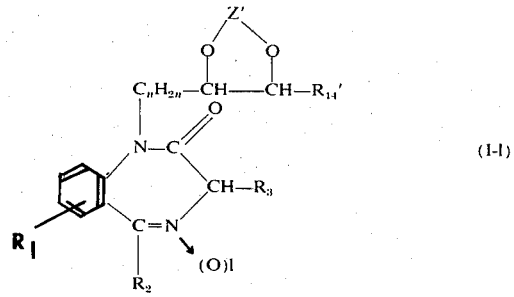

(I-l)

wherein $R_1$, $R_2$, $R_3$, $R_{14}'$, $l$ and $n$ are as defined above, and Z' represents carbonyl, or a group of the formula,

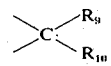

[in which $R_9$ and $R_{10}$ are as defined above], or salts thereof, may be converted to the corresponding compounds of the formula (I-c) by hydrolysis. The hydrolysis is effected in a solvent or solvent mixture, preferably in the presence of an acid. Suitable solvents include water or lower alkanol such as methanol, ethanol, isopropanol, or mixtures of water and organic solvent such as lowr alkanol (e.g. methanol, ethanol, propanol and isopropanol), dioxane ethylene glycol, propylene glycol, ethylene glycol monomethyl ether, ethylene glycol monoethyl ether, ethylene glycol monobutyl ether, ethylene glycol dimethyl ether, ethylene glycol diethylether, diethylene glycol lower alkyl ether, dimethyl sulfoxide and the like. Examples of the acids include mineral acid such as hydrochloric acid, hydrobromic acid, or hydroiodic acid, and organic acid such as acetic acid, oxalic acid or formic acid. The reaction is generally carried out at room temperature or at elevated temperature.

The thus obtained benzodiazepine derivatives of the formula (I) form pharmaceutically acceptable acid addition salts with pharmaceutically acceptable inorganic and organic acids such as hydrochloric acid, hydrobromic acid, sulfuric acid, phosphoric acid, nitric acid, acetic acid, maleic acid, fumaric acid, tartaric acid, succinic acid, citric acid, camphorsulfonic acid, ethanesulfonic acid, ascorbic acid, lactic acid, and the like.

The benzodiazepine derivatives of the formula (I) or their pharmaceutically acceptable acid addition salts are useful as tranquilizers, sedatives, muscle relaxants, hypnotics and anticonvulsants.

Benzodiazepines or salts thereof of the present invention can be administered parenterally or orally in therapeutic dosage forms with dosage adjusted to individual needs, that is, in solid or liquid dosage forms such as tablets, dragees, capsules, suspensions, solutions, elixirs and the like.

This invention is further illustrated by the following examples of preferred embodiments thereof, which are presented for the purpose of illustration and are not intended to limit the scope of the invention.

EXAMPLE 1

A solution of 5 g of 5-phenyl-7-chloro-1,3-dihydro-2H-1,4-benzodiazepin-2-one in 40 ml of N,N-dimethylformamide is added to a suspension of 1.3 g of sodium methoxide in 40 ml of N,N-dimethylformamide, and the mixture is heated at 50°–60°C for 1 hour. A solution of 4 g of 2-hydroxy-3-methoxypropyl chloride in 20 ml of N,N-dimethylformamide is added to the above mixture, and the resulting mixture is stirred at 110°–120°C for 9 hours. After the mixture is cooled, poured into icewater, it is extracted with ether. The ether extracts are combined, washed with saturated sodium chloride solution, dried over sodium sulfate, and the solvent is removed under reduced pressure. The residue is dissolved in chloroform and chromatographed on silica gel, eluting with chloroform-ethyl acetate (1:1 vol/vol) to give 1-($\beta$-hydroxy-$\gamma$-methoxy-propyl)-5-phenyl-7-chloro-1,3-dihydro-2H-1,4-benzodiazepin-2-one as a solid. Recrystallization from methylene chloride-isopropyl ether gives colorless prisms, m.p. 116°–118°C.

EXAMPLE 2

Using the procedure similar to that in Example 1, but replacing 5-phenyl-7-chloro-1,3-dihydro-2H-1,4-benzodiazepin-2-one by 5-(o-fluorophenyl)-7-chloro-1,3-dihydro-2H-1,4-benzodiazepin-2-one, there is obtained 1-($\beta$-hydroxy-$\gamma$-methoxy-propyl)-5-(o-fluorophenyl)-7-chloro-1,3-dihydro-2H-1,4-benzodiazepin-2-one as a colorless viscous oil. $\nu_{max}^{Nujol}$ 3450 cm$^{-1}$ (—OH), 1660 cm$^{-1}$ (>N—CO—).

Similarly, the following compounds are obtained.

1-($\beta$-Hydroxy-$\gamma$-ethoxy-propyl)-5-phenyl-7-chloro-1,3-dihydro-2H-1,4-benzodiazepin-2-one, as an oil, $\nu_{max}^{Nujol}$ 3450 cm$^{-1}$ (—OH), 1660 cm$^{-1}$ (>N—CO—).

1-($\beta$-Hydroxy-$\gamma$-ethoxy-propyl)-5-(o-fluorophenyl)-7-chloro-1,3-dihydro-2H-1,4-benzodiazepin-2-one, as an oil, $\nu_{max}^{Nujol}$ 3450 cm$^{-1}$ (—OH), 1660 cm$^{-1}$ (>N—CO—).

1-($\beta$-Acetoxy-$\gamma$-methoxy-propyl)-5-phenyl-7-chloro-1,3-dihydro-2H-1,4-benzodiazepin-2-one, m.p. 121°–123°C.

1-($\beta$, $\gamma$-Diacetoxy-propyl)-5-phenyl-7-chloro-1,3-dihydro-2H-1,4-benzodiazepin-2-one, m.p. 139°–141°C.

1-($\beta$, $\gamma$-Dihydroxy-propyl)-5-phenyl-7-chloro-1,3-dihydro-2H-1,4-benzodiazepin-2-one-4-oxide, m.p. 187°–189°C.

EXAMPLE 3

A solution of 5 g of 5-phenyl-7-chloro-1,3-dihydro-2H-1,4-benzodiazepin-2-one in 40 ml of N,N-dimethylformamide is added to a suspension of 1.3 g of sodium methoxide in 40 ml of N,N-dimethylformamide, and the mixture is heated at 50°–60°C for 1 hour, 5.2 g of 2-chloromethyl-1,4-benzodioxane in 20 ml of dry toluene is added thereto. The resulting mixture is stirred at 100°–120°C for 6 hours. After the reaction mixture is cooled, poured into ice-water, it is extracted with methylene chloride. The methylene chloride extracts are combined and dried over sodium sulfate, and the solvent is removed under reduced pressure. The residue is dissolved in benzene and chromatographed on alumina, eluting with benzene to give a solid. Recrystallization from a mixture of isopropyl alcohol and isopropyl ether gives 1-($\alpha,\delta$-benzodioxan-$\beta$-yl-methyl)-5-phenyl-7-chloro-1,3-dihydro-2H-1,4-benzodiazepin-2-one as a colorless prisms, m.p. 142°–144°C.

EXAMPLE 4

Using the procedure similar to that in Example 3, but replacing 5-phenyl-7-chloro-1,3-dihydro-2H-1,4-benzodiazepin-2-one by 5-(o-fluorophenyl)-7-chloro-1,3-dihydro-2H-1,4-benzodiazepin-2-one, there is obtained 1-($\alpha,\delta$-benzodioxan-$\beta$-yl-methyl)-5-(o-fluorophenyl)-7-chloro-1,3-dihydro-2H-1,4-benzodiazepin-2-one, m.p. 129°–131°C.

EXAMPLE 5

Using the procedure similar to that in Example 3, but replacing 2-chloromethyl-1,4-benzodioxane by 4-chloromethyl-2,2-dimethyl-1,3-dioxolane, there is obtained 1-($\beta,\gamma$-isopropylidenedioxy-propyl)-5-phenyl-7-chloro-1,3-dihydro-2H-1,4-benzodiazepin-2-one, m.p. 115°–118°C.

EXAMPLE 6

To a suspension of 1.23 g of sodium methoxide in 100 ml of dry toluene is added, 5 g of 5-phenyl-7-chloro-1,3-dihydro-2H-1,4-benzodiazepin-2-one, and the mixture is heated at 60°C for 1 hour. To the mixture is added a solution of 4.9 g of glycidyl methyl ether in 40 ml of methanol. The resulting mixture is heated under refluxing for 6 hours. After the reaction mixture is cooled, poured into ice-water, it is extracted with ether. The ether extracts are combined, washed with saturated sodium chloride solution, dried over sodium sulfate, and the solvent is removed under reduced pressure. The residue is dissolved in chloroform and chromatographed on silica gel, eluting with chloroform-ethylacetate (1:1 vol/vol) to give 1-($\beta$-hydroxy-$\gamma$-methoxypropyl)-5-phenyl-7-chloro-1,3-dihydro-2H-1,4-benzodiazepin-2-one as a solid. Recrystallization from methylene chlorideisopropyl ether gives colorless prisms, m.p. 116°–118°C.

EXAMPLE 7

Using the procedure similar to that in Example 6, but replacing glycidyl methyl ether by glycidol, there is obtained 1-(β,γ-dihydroxy-propyl)-5-phenyl-7-chloro-1,3-dihydro-2H-1,4-benzodiazepin-2-one, m.p. 154°–155°C.

EXAMPLE 8

Using the procedure similar to that in Example 6, but replacing glycidyl methyl ether by glycidyl ethyl ether, there is obtained 1-(β-hydroxy-γ-ethoxy-propyl)-5-phenyl-7-chloro-1,3-dihydro-2H-1,4-benzodiazepin-2-one as a pale yellow viscous oil, $\nu_{max}^{Nujol}$ 3450 cm$^{-1}$ (—OH), 1660 cm$^{-1}$ (>N—CO—).

EXAMPLE 9

Ten grams of 5-phenyl-7-chloro-1,3-dihydro-2H-1,4-benzodiazepin-2-one is added to a suspension of 2.6 g of sodium methoxide in 200 ml of dry toluene, and the mixture is stirred at 60°C for 1 hour. To the mixture is added a solution of 12.8 g of 1,2-epoxy-3-isopropylamino-propane in 80 ml of methanol. The resulting mixture is refluxed for 10 hours. After the reaction mixture is cooled, poured into ice-water, it is extracted with chloroform. The chloroform extracts are combined, washed with saturated sodium chloride solution, dried over sodium sulfate, and the solvent is removed under reduced pressure. The residue is dissolved in ether and treated with excess ethereal hydrogen chloride to give 1-(β-hydroxy-γ-isopropylamino-propyl)-5-phenyl-7-chloro-1,3-dihydro-2H-1,4-benzodiazepin-2-one dihydrochloride as a hygroscopic substance. This dihydrochloride is dissolved in acetone-methanol and the solvent is removed under reduced pressure. This operation is repeated several times to give crystalline monohydrochloride. Recrystallization from isopropyl alcohol-methylene chloride gives 1-(β-hydroxy-γ-isopropylamino-propyl)-5-phenyl-7-chloro-1,3-dihydro-2H-1,4-benzodiazepin-2-one monohydrochloride as a colorless prisms, m.p. 257°–258°C (decomposition).

EXAMPLE 10

Using the procedure similar to that in Example 9, but replacing 5-phenyl-7-chloro-1,3-dihydro-2H-1,4-benzodiazepin-2-one by 5-(o-fluorophenyl)-7-chloro-1,3-dihydro-2H-1,4-benzodiazepin-2-one, there is obtained 1-(β-hydroxy-γ-isopropylamino-propyl)-5-(o-fluorophenyl)-7-chloro-1,3-dihydro-2H-1,4-benzodiazepin-2-one monohydrochloride, m.p. 239°–242°C (decomposition).

EXAMPLE 11

Using the procedure similar to that in Example 6, but replacing glycidyl methyl ether by glycidyl methacrylate, there is obtained 1-(β,γ-dihydroxypropyl)-5-phenyl-7-chloro-1,3-dihydro-2H-1,4-benzodiazepin-2-one, m.p. 154°–155°C.

EXAMPLE 12

A solution of 1 g of 1-(β,γ-epoxy-propyl)-5-phenyl-7-chloro-1,3-dihydro-2H-1,4-benzodiazepin-2-one in chloroform is poured onto a column filled up with 20 g of silica gel in chloroform, adsorbed and developed with chloroform, and then the column is allowed to stand overnight, eluted with ethyl acetate to give a solid, which is recrystallized from a mixture of isopropyl ether and isopropyl alcohol to give 1-(β,γ-dihydroxy-propyl)-5-phenyl-7-chloro-1,3-dihydro-2H-1,4-benzodiazepin-2-one as a colorless prisms, m.p. 154°–155°C.

EXAMPLE 13

A solution of 1 g of 1-(β,γ-epoxy-propyl)-5-phenyl-7-chloro-1,3-dihydro-2H-1,4-benzodiazepin-2-one in 20 ml of acetone is cooled below 10°C and treated with 5 % aqueous sulfuric acid. The mixture is stirred at room temperature for 15 hours and then poured into ice-water, basified with ammonia water, extracted with methylene chloride. The methylene chloride extracts are combined, washed with saturated sodium chloride solution, dried over sodium sulfate, and the solvent is removed under reduced pressure. The residue is crystallized from isopropyl ether and recrystallized from a mixture of isopropyl alcohol and isopropyl ether to give 1-(β,γ-dihydroxy-propyl)-5-phenyl-7-chloro-1,3-dihydro-2H,1,4-benzodiazepin-2-one as a colorless prisms, m.p. 154°–155°C.

EXAMPLE 14

A solution of 1 g of 1-(β,γ-diacetoxy-propyl)-5-phenyl-7-chloro-1,3-dihydro-2H-1,4-benzodiazepin-2-one in 15 ml of methanol is treated with a solution of 0.4 g sodium hydroxide in 1 ml of water. The resulting mixture is stirred at room temperature for 10 hours. The reaction mixture is poured into ice-water, extracted with methylene chloride. The methylene chloride extracts are combined, washed with saturated sodium chloride solution, dried over sodium sulfate, and the methylene chloride is removed. The residue is crystallized from isopropyl ether and recrystallized from a mixture of isopropyl alcohol and isopropyl ether to give 1-(β,γ-dihydroxypropyl)-5-phenyl-7-chloro-1,3-dihydro-2H-1,4-benzodiazepin-2-one which is identified with the product in Example 13.

EXAMPLE 15

A solution of 2 g of 1-(β,γ-epoxy-propyl)-5-phenyl-7-chloro-1,3-dihydro-2H-1,4-benzodiazepin-2-one in 15 ml of glacial acetic acid is heated to 70°–80°C for 5 hours. The reaction mixture is poured into ice-water, basified with ammonia water and extracted with methylene chloride. The methylene chloride extracts are combined, and the solvent is removed under reduced pressure. The residue is dissolved in methanol, treated with a solution of 0.5 g of sodium hydroxide in 1 ml of water, and the resulting mixture is stirred at room temperature overnight. The reaction mixture is poured into ice-water, extracted with methylene chloride. The methylene chloride extracts are combined, washed with saturated sodium chloride solution, dried over sodium sulfate, and the methylene chloride is removed. The residue is crystallized from isopropyl ether and recrystallized from a mixture of isopropyl alcohol and isopropyl ether to give 1-(β,γ-dihydroxy-propyl)-5-phenyl-7-chloro-1,3-dihydro-2H-1,4-benzodiazepin-2-one which is identified with the product in Example 13.

EXAMPLE 16

A solution of 1 g of 1-(β,γ-epoxy-propyl)- 5-phenyl-7-chloro-1,3-dihydro-2H-1,4-benzodiazepin-2-one in 10 ml of methanol is added to a suspension of 0.5 g of sodium methoxide in 10 ml of toluene. The mixture is stirred at 80°–90°C for 5 hours. After the reaction mixture is cooled, poured into ice-water, basified with ammonia water, and it is extracted with ether. The ether extracts are combined, dried over sodium sulfate, and the solvent is removed. The residue is dissolved in chloroform and chromatographed on silica gel, eluting with chloroform-ethyl acetate (1:1 vol/vol) to give 1-($\beta$-hydroxy-$\gamma$-methoxy-propyl)-5-phenyl-7-chloro-1,3-dihydro-2H-1,4-benzodiazepin-2-one as a solid. Recrystallization from methylene chloride-isopropyl ether gives colorless prisms, m.p. 116°–118°C.

EXAMPLE 17

A solution of 1 g of 1-($\beta$,$\gamma$-epoxy-propyl)-5-phenyl-7-chloro-1,3-dihydro-2H-1,4-benzodiazepin-2-one in 10 ml of isopropyl alcohol is added to 3 g of isopropyl amine. The mixture is heated under refluxing for 3 hours. The reaction mixture is concentrated under reduced pressure. The residue is dissolved in chloroform and filtered over silica gel using a mixture of chloroform and ethanol (1:1 vol/vol) as an eluent to give 1-($\beta$-hydroxy-$\gamma$-isopropylamino-propyl)-5-phenyl-7-chloro-1,3-dihydro-2H-1,4-benzodiazepin-2-one as a viscous oil. This oil is dissolved in ether, treated with excess ethereal hydrogen chloride to give 1-($\beta$-hydroxy-$\gamma$-isopropylamino-propyl)-5-phenyl-7-chloro-1,3-dihydro-2H-1,4-benzodiazepin-2-one dihydrochloride, as a hygroscopic substance. This dihydrochloride is dissolved in acetonemethanol and the solvent is removed under reduced pressure. This operation is repeated several times to give crystalline monohydrochloride. Recrystallization from isopropyl alcohol-methylene chloride gives 1-($\beta$-hydroxy-$\gamma$-isopropylamino-propyl)-5-phenyl-7-chloro-1,3-dihydro-2H-1,4-benzodiazepin-2-one monohydrochloride as a colorless prisms, m.p. 257°–258°C (decomposition).

EXAMPLE 18

Using the procedure similar to that in Example 17, but replacing 1-($\beta$, $\gamma$-epoxy-propyl-5-phenyl-7-chloro-1,3-dihydro-2H-1,4-benzodiazepin-2-one by 1-($\beta$,$\gamma$-epoxy-propyl)-5-(o-fluorophenyl)-7-chloro-1,3-dihydro-2H-1,4-benzodiazepin-2-one, there is obtained 1-($\beta$-hydroxy-$\gamma$-isopropylamino-propyl)-5-(o-fluorophenyl)-7-chloro-1,3-dihydro-2H-1,4-benzodiazepin-2-one monohydrochloride, m.p. 239°–242°C (decomposition).

EXAMPLE 19

To a solution of 1 g of 2-($\beta$-hydroxy-$\gamma$-methoxy-propyl)amino-5-chloro-benzophenone in 15 ml of methylene chloride is added 1 g of oxazolid-2,5-dione. To the mixture is added 10 ml of ethereal hydrogen chloride under cooling, and the mixture is stirred at room temperature. The reaction mixture is poured into ice-water, basified with ammonia water and extracted with methylene chloride. The methylene chloride extracts are combined and dried over sodium sulfate. The solvent is removed under reduced pressure. The residue is crystallized and recrystallized from a mixture of isopropyl ether and methylene chloride to give 1-($\beta$-hydroxy-$\gamma$-methoxy-propyl)-5-phenyl-7-chloro-1,3-dihydro-2H-1,4-benzodiazepin-2-one, m.p. 116°–118°C.

EXAMPLE 20

Using the procedure similar to that in Example 19, but replacing 2-($\beta$-hydroxy-$\gamma$-methoxy-propyl)amino-5-chloro-benzophenone by 2-($\beta$-acetoxy-$\gamma$-methoxy-propyl)-amino-5-chloro-benzophenone, there is obtained 1-($\beta$-acetoxy-$\gamma$-methoxy-propyl)-5-phenyl-7-chloro-1,3-dihydro-2H-1,4-benzodiazepin-2-one, m.p. 121°–123°C.

Similarly, using above procedure the following compounds are obtained.

1-($\beta$,$\gamma$-Diacetoxy-propyl)-5-phenyl-7-chloro-1,3-dihydro-2H-1,4-benzodiazepin-2-one, m.p. 139°–141°C.

1-($\beta$-Hydroxy-$\gamma$-methoxy-propyl)-5-(o-fluorophenyl)-7-chloro-1,3-dihydro-2H-1,4-benzodiazepin-2-one, viscous oil, $\nu_{max}^{Nujol}$ 3450 cm$^{-1}$ (—OH), 1660 cm$^{-1}$ (>N—CO—).

1-($\beta$, $\gamma$-Dihydroxy-propyl)-5-phenyl-7-chloro-1,3-dihydro-2H-1,4-benzodiazepin-2-one, m.p. 154°–155°C.

EXAMPLE 21

A mixture of 1 g of 2-[N$^1$-($\beta$-acetoxy-$\gamma$-methoxy-propyl)-N$^1$-(N$^2$-carbobenzoxyglycyl)amido]-5-chlorobenzophenone and 25 ml of 20 % hydrogen bromide in acetic acid is stirred at room temperature for 3 hours. The reaction mixture is poured into water, basified with ammonia water and extracted with methylene chloride. The methylene chloride extracts are combined, dried over sodium sulfate, and the solvent is removed. The residue is crystallized and recrystallized from isopropyl alcohol to give 1-($\beta$-acetoxy-$\gamma$-methoxy-propyl)-5-phenyl-7-chloro-1,3-dihydro-2H-1,4-benzodiazepin-2-one, m.p. 121°–123°C.

EXAMPLE 22

Using the procedure similar to that in Example 21, but replacing 2-[N$^1$-($\beta$-acetoxy-$\gamma$-methoxy-propyl)-N$^1$-(N$^2$-carbobenzoxyglycyl)amido]-5-chloro-benzophenone by 2-[N$^1$-($\beta$,$\gamma$-diacetoxy-propyl)-N$^1$-(N$^2$-carbobenzoxyglycyl)amido]-5-chloro-benzophenone, there is obtained 1-($\beta$,$\gamma$-Diacetoxy-propyl)-5-phenyl-7-chloro-1,3-dihydro-2H-1,4-benzodiazepin-2-one, m.p. 139°–141°C.

Similarly, using above procedure the following compounds are obtained.

1-($\beta$-Hydroxy-$\gamma$-methoxy-propyl)-5-phenyl-7-chloro-1,3-dihydro-2H-1,4-benzodiazepin-2-one, 116°–118°C.

1-($\beta$-Hydroxy-$\gamma$-methoxy-propyl)-5-(o-fluorophenyl)-7-chloro-1,3-dihydro-2H-1,4-benzodiazepin-2-one, viscous oil, $\nu_{max}^{Nujol}$ 3450 cm$^{-1}$ (—OH), 1660 cm$^{-1}$ (>N—CO—).

EXAMPLE 23

To a solution of 1 g of 2-[N-phtalimidoacetyl-N-($\beta$-acetoxy-$\gamma$-methoxy-propyl)amino]-5-chloro-benzophenone in 20 ml of ethanol is added a solution of 0.5 g of hydrazine hydrate in 0.5 ml of water. The mixture is stirred at room temperature for 20 hours. The reaction mixture is concentrated under reduced pressure, diluted with water, basified with ammonia water and extracted with ether. The ethereal extracts are combined and dried over sodium sulfate and the solvent is removed. The residue is crystallized and recrystallized from isopropyl alcohol to give 1-($\beta$- acetoxy-γ-methoxy-propyl)-5-phenyl-7-chloro-1,3-dihydro-2H-1,4-benzodiazepin-2-one, m.p. 121°–123°C.

EXAMPLE 24

Using the procedure similar to that in Example 23, but replacing 2-[N-phtalimidoacetyl-N-(β-acetoxy-γ-methoxy-propyl)amino]-5-chloro-benzophenone by 2-[N-phtalimidoacetyl-N-(β,γ-diacetoxy-propyl)amino]-5-chloro-benzophenone, there is obtained 1-(β,γ-diacetoxy-propyl)-5-phenyl-7-chloro-1,3-dihydro-2H-1,4-benzodiazepin-2-one, m.p. 139°–141°C.

Similarly, using above procedure the following compounds are obtained.

1-(β-Hydroxy-γ-methoxy-propyl)-5-phenyl-7-chloro-1,3-dihydro-2H-1,4-benzodiazepin-2-one, m.p. 116°–118°C.

1-(β,γ-Dihydroxy-propyl)-5-phenyl-7-chloro-1,3-dihydro-2H-1,4-benzodiazepin-2-one, m.p. 154°–155°C.

1-(β-Hydroxy-γ-methoxy-propyl)-5-(o-fluorophenyl)-7-chloro-1,3-dihydro-2H-1,4-benzodiazepin-2-one, viscous oil, $\nu_{max}^{Nujol}$ 3450 cm$^{-1}$ (—OH), 1660 cm$^{-1}$ (>N—CO—).

EXAMPLE 25

Ozonized oxygen is bubbled into a stirred solution of 1 g of 1-(β-acetoxy-γ-methoxy-propyl)-2-aminomethyl-3-phenyl-5-chloroindole hydrochloride in 15 ml of acetic acid at 20°C for 2 hours. The reaction mixture is poured into ice-water, basified with ammonia water and extracted with methylene chloride. The methylene chloride extracts are combined, washed with saturated sodium chloride solution, dried over sodium sulfate and the solvent is removed. The residue is crystallized and recrystallized from isopropyl alcohol to give 1-(β-acetoxy-γ-methoxy-propyl)-5-phenyl-7-chloro-1,3-dihydro-2H-1,4-benzodiazepin-2-one, m.p. 121°–123°C.

EXAMPLE 26

Using the procedure similar to that in Example 25, but replacing 1-(β-acetoxy-γ-methoxy-propyl)-2-aminomethyl-3-phenyl-5-chloroindole hydrochloride by 1-(β,γ-diacetoxy-propyl)-2-aminomethyl-3-phenyl-5-chloroindole hydrochloride, there is obtained 1-(β,γ-diacetoxy-propyl)-5-phenyl-7-chloro-1,3-dihydro-2H-1,4-benzodiazepin-2-one, m.p. 139°–141°C.

Similarly, using above procedure the following compounds are obtained.

1-(β-Hydroxy-γ-methoxy-propyl)-5-phenyl-7-chloro-1,3-dihydro-2H-1,4-benzodiazepin-2-one, m.p. 116°–118°C.

1(β-Hydroxy-γ-methoxy-propyl)-5-(o-fluorophenyl)-7-chloro-1,3-dihydro-2H-1,4-benzodiazepin-2-one, viscous oil, $\nu_{max}^{Nujol}$ 3450 cm$^{-1}$ (—OH), 1660 cm$^{-1}$ (>N—CO—).

EXAMPLE 27

To a mixture of 1 g of 2-[N-azidoacetyl-N-(β-acetoxy-γ-methoxy-propyl)amino]-5-chloro-benzophenone and 0.2 g of 5 % palladium carbon in 20 ml of ethanol is added a solution of 0.15 g of hydrazine hydrate in 5 ml of ethanol. The resulting mixture is stirred at room temperature for 2 hours and at 50°C for 30 minutes. The reaction mixture is filtered and the solvent is removed. The residue is crystallized and recrystallized from isopropyl alcohol to give 1-(β-acetoxy-γ-methoxy-propyl)5-phenyl-7-chloro-1,3-dihydro-2H-1,4-benzodiazepin-2-one, m.p. 121°–123°C.

EXAMPLE 28

Using the procedure similar to that in Example 27, but replacing 2-[N-azidoacetyl-N-(β-acetoxy-γ-methoxy-propyl)amino]-5-chloro-benzophenone by 2-[N-azidoacetyl-N-(β,γ-diacetoxy-propyl)amino]-5-chloro-benzophenone, there is obtained 1-(β,γ-diacetoxy-propyl)-5-phenyl-7-chloro-1,3-dihydro-2H-1,4-benzodiazepin-2-one, m.p. 139°–141°C.

Similarly, using above procedure the following compounds are obtained.

1-(β-Hydroxy-γ-methoxy-propyl)-5-phenyl-7-chloro-1,3-dihydro-2H-1,4-benzodiazepin-2-one, m.p. 116°–118°C.

1-(β-Hydroxy-γ-methoxy-propyl)-5-(o-fluorophenyl)-7-chloro-1,3-dihydro-2H-1,4-benzodiazepin-2-one, viscous oil, $\nu_{max}^{Nujol}$ 3450 cm$^{-1}$ (—OH), 1660 cm$^{-1}$ (>N—CO—).

EXAMPLE 29

A solution of 0.9 g of 1-(β,γ-dihydroxypropyl)-5-phenyl-7-chloro-1,3-dihydro-2H-1,4-benzodiazepin-2-one in 20 ml of acetic anhydride is added to 2 g of potassium acetate, and the mixture is allowed to stand overnight. The reaction mixture is poured into ice-water, neutralized with solid potassium carbonate, extracted with methylene chloride. The methylene chloride extracts are combined and dried over sodium sulfate, and the solvent is removed under reduced pressure. The residue is crystallized and recrystallized from isopropyl alcohol to give 1-(β,γ-diacetoxy-propyl)-5-phenyl-7-chloro-1,3-dihydro-2H-1,4-benzodiazepin-2-one as a colorless prisms, m.p. 139°–141°C.

EXAMPLE 30

Using the procedure similar to that in Example 29, but replacing 1-(β,γ-dihydroxy-propyl)-5-phenyl-7-chloro-1,3-dihydro-2H-1,4-benzodiazepin-2-one by 1-(β-hydroxy-γ-methoxy-propyl)-5-phenyl-7-chloro-1,3-dihydro-2H-1,4-benzodiazepin-2-one, there is obtained 1-(β-acetoxy-γ-methoxy-propyl)-5-phenyl-7-chloro-1,3-dihydro-2H-1,4-benzodiazepin-2-one, m.p. 121°–123°C.

EXAMPLE 31

To a solution of 1 g of 1-(β-acetoxy-γ-methoxy-propyl)-5-phenyl-7-chloro-1,3-dihydro-2H-1,4-benzodiazepin-2-one in 15 ml of methanol is added a solution of 0.25 g of potassium hydroxide in 1 ml of water. The resulting mixture is stirred at room temperature for 12 hours. The reaction mixture is poured into ice-water and extracted with methylene chloride. The methylene chloride extracts are combined, washed with saturated sodium chloride solution and dried over sodium sulfate, and the methylene chloride is removed. The residue is crystallized from isopropyl ether and recrystallized from a mixture of methylene chloride and isopropyl ether to give 1-(β-hydroxy-γ-methoxy-propyl)-5-phenyl-7-chloro-1,3-dihydro-2H-1,4-benzodiazepin-2-one as a colorless prisms, m.p. 116°–118°C.

EXAMPLE 32

Using the procedure similar to that in Example 29, but replacing 1-(β-acetoxy-γ-methoxy-propyl)-5-phenyl-7-chloro-1,3-dihydro-2H-1,4-benzodiazepin-2-one by 1-(β-acetoxy-γ-ethoxy-propyl)-5-phenyl-7-chloro-1,3-dihydro-2H-1,4-benzodiazepin-2-one, there is obtained 1-(β-hydroxy-γ-ethoxypropyl)-5-phenyl-7-chloro-1,3-dihydro-2H-1,4-benzodiazepin-2-one as a colorless viscous oil, $\nu_{max}^{Nujol}$ 3450 cm$^{-1}$ (—OH), 1660 cm$^{-1}$ (>N—CO—).

EXAMPLE 33

1 g of 1-(β,γ-dihydroxy-propyl)-5-phenyl-7-chloro-1,3-dihydro-2H-1,4-benzodiazepin-2-one is added to a solution of 0.2 g of p-toluenesulfonic acid in 20 ml of dioxane, and then 5 ml of 2,2-dimethoxypropane is added. The resulting mixture is stirred at 50°–60°C for 2 hours. The reaction mixture is cooled, poured into ice-water, basified with ammonia water, and extracted with methylene chloride. The methylene chloride extracts are combined and dried over sodium sulfate, and the solvent is removed. The residue is crystallized and recrystallized from a mixture of isopropyl alcohol and isopropyl ether to give 1-(β,γ-isopropylidenedioxypropyl)-5-phenyl-7-chloro-1,3-dihydro-2H-1,4-benzodiazepin-2-one, m.p. 115°–118°C.

EXAMPLE 34

1 g of 1-(β,γ-carbonyldioxy-propyl)-5-phenyl-7-chloro-1,3-dihydro-2H-1,4-benzodiazepin-2-one is added to a solution of 10 ml of 2N-hydrochloric acid, and the mixture is warmed on the water bath for 3 hours. The reaction mixture is cooled, poured into ice-water, basified with ammonia water, and extracted with methylene chloride. The methylene chloride extracts are combined and dried over sodium sulfate, and the methylene chloride is removed. The residue is crystallized and recrystallized from a mixture of isopropyl alcohol and isopropyl ether to give 1-(β,γ-dihydroxy-propyl)-5-phenyl-7-chloro-1,3-dihydro-2H-1,4-benzodiazepin-2-one, m.p. 154°–155°C.

EXAMPLE 35

To a solution of 1 g of 1-(β,γ-isopropylidenedioxy-propyl)-5-phenyl-7-chloro-1,3-dihydro-2H-1,4-benzodiazepin-2-one in 15 ml of ethyleneglycol monomethyl ether is added 2 g of boric acid. The resulting mixture is stirred at 90°–100°C for 1.5 hours. The reaction mixture is cooled, poured into ice-water, basified with ammonia water, and extracted with methylene chloride. The methylene chloride extracts are combined and dried over sodium sulfate, and the solvent is removed. The residue is crystallized and recrystallized from a mixture of isopropyl alcohol and isopropyl ether to give 1-(β,γ-dihydroxy-propyl)-5-phenyl-7-chloro-1,3-dihydro-2H-1,4-benzodiazepin-2-one, which is identified with the product in Example 34.

What is claimed is:

1. A benzodiazepine represented by the formula

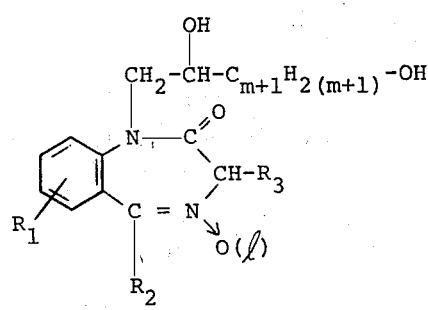

wherein
$R_1$ represents hydrogen, halogen, nitro or trifluoromethyl;
$R_2$ represents pyridyl, cyclohexenyl or a group of the formula

wherein $R_7$ and $R_8$ each represents hydrogen, halogen, lower alkyl or trifluoromethyl;
$R_3$ represents hydrogen, lower alkyl, phenyl, naphthyl, mono- or disubstituted phenyl wherein the substituent is halogen, lower alkyl, lower alkoxy, nitro and trifluoromethyl; benzyl, phenethyl, β-phenylpropyl or naphthethyl; $l$ represents 0 or 1; and $m$ represents 0, 1, 2, or 3.

2. A benzodiazepine represented by the formula

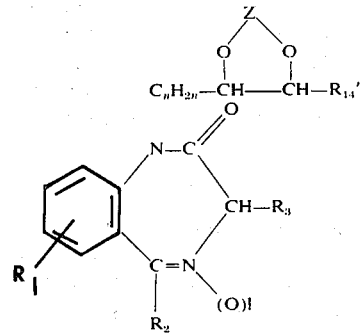

wherein
$R_1$ represents hydrogen, halogen, nitro or trifluoromethyl;
$R_2$ represents pyridyl, cyclohexenyl or a group of the formula

wherein $R_7$ and $R_8$ each represents hydrogen, lower alkyl, phenyl, naphthyl, mono- or disubstituted phenyl wherein the substituent is halogen, lower alkyl, lower alkoxy, nitro and trifluoromethyl; benzyl, phenethyl, β-phenyl propyl, or naphthethyl;
$l$ represents 0 or 1;
$n$ represents 1, 2, 3 or 4;

$R_{14}'$ is hydrogen, lower alkyl, lower alkenyl, cyclopropyl, cyclobutyl, cyclohexyl, cyclopentyl, cyclopropylmethyl, cyclobutylmethyl, cyclobutylethyl, cyclopentylmethyl, cyclohexylmethyl, cyclohexylethyl, phenyl, naphthyl, mono- or disubstituted phenyl wherein the substituent is halogen, lower alkyl, lower alkoxy, nitro and trifluoromethyl; benzyl, phenethyl, β-phenylpropyl and naphthenyl, and Z represents a group of the formula

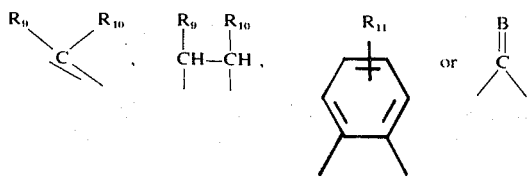

wherein $R_9$ and $R_{10}$ each represents hydrogen, lower alkyl, lower alkenyl, phenyl, naphthyl, mono- or disubstituted phenyl wherein the substituent is halogen, lower alkyl, lower alkoxy, nitro and trifluoromethyl; benzyl, phenethyl, β-phenylpropyl, naphthenyl, cyclopropyl, cyclobutyl, cyclohexyl, cyclopentyl, cyclopropylmethyl, cyclobutylmethyl, cyclobutylethyl, cyclopenthylmethyl, cyclohexylmethyl or cyclohexylethyl;

$R_{11}$ represents hydrogen, lower alkyl or halogen; and

B represent oxygen or sulfur.

3. The benzodiazepine of claim 2 wherein Z is a group of the formula

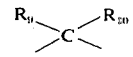

4. The benzodiazepine of claim 2 which is 1-(α,δ-benzodioxan-β-yl-methyl)-5-(0-fluorophenyl)-7-chloro-1,3-dihydro-2H-1,4-benzodiazepin-2-one.

5. The benzodiazepine of claim 2 which is 1-(β,γ-isopropylidenedioxy-propyl)-5-phenyl-7-chloro-1,3-dihydro-2H-1,4-benzodiazepin-2-one.

6. The benzodiazepine of claim 1 which is 1-(β, γ-dihydroxy-propyl)-5-phenyl-7-chloro-1,3-dihydro-2H-1,4-benzodiazepin-2-one.

* * * * *